(12) United States Patent
Hummel et al.

(10) Patent No.: US 8,806,025 B2
(45) Date of Patent: Aug. 12, 2014

(54) SYSTEMS AND METHODS FOR INPUT/OUTPUT VIRTUALIZATION

(75) Inventors: Mark Hummel, Franklin, MA (US); David E. Mayhew, Northborough, MA (US); Michael J. Osborn, Hollis, NH (US); Anton Chernoff, Littleton, MA (US); Venkata S. Krishnan, Ashland, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 229 days.

(21) Appl. No.: 13/531,890

(22) Filed: Jun. 25, 2012

(65) Prior Publication Data

US 2013/0346531 A1    Dec. 26, 2013

(51) Int. Cl.
| | |
|---|---|
| *G06F 15/16* | (2006.01) |
| *H04L 12/00* | (2006.01) |
| *H04Q 1/00* | (2006.01) |
| *H04W 76/00* | (2009.01) |
| *H04Q 3/00* | (2006.01) |

(52) U.S. Cl.
CPC .................. *H04L 12/00* (2013.01); *H04Q 1/00* (2013.01); *H04W 76/00* (2013.01); *H04Q 3/00* (2013.01)
USPC ........... 709/227; 709/212; 709/220; 370/230; 370/235; 718/1

(58) Field of Classification Search
USPC ................ 370/235, 230; 718/1, 100
See application file for complete search history.

(56) References Cited

U.S. PATENT DOCUMENTS

| | | | |
|---|---|---|---|
| 7,502,884 B1 | 3/2009 | Shah et al. | |
| 7,826,359 B2 * | 11/2010 | Tripathi et al. | 370/230 |
| 7,925,802 B2 | 4/2011 | Lauterbach et al. | |
| 7,945,647 B2 * | 5/2011 | Tripathi | 709/220 |
| 2008/0320181 A1 | 12/2008 | Lauterbach et al. | |
| 2009/0216920 A1 | 8/2009 | Lauterbach et al. | |
| 2011/0090915 A1 * | 4/2011 | Droux et al. | 370/411 |
| 2012/0005521 A1 | 1/2012 | Droux et al. | |
| 2012/0069730 A1 * | 3/2012 | Johnsen | 370/218 |
| 2013/0346531 A1 * | 12/2013 | Hummel et al. | 709/212 |

FOREIGN PATENT DOCUMENTS

WO    2010063985 A1    6/2010

OTHER PUBLICATIONS

International Search Report and Written Opinion in Related International Patent Application No. PCT/US13/44014 mailed on Sep. 9, 2013, 14 pages.

* cited by examiner

*Primary Examiner* — Michael Y Won
(74) *Attorney, Agent, or Firm* — Schmeiser, Olsen & Watts LLP

(57) ABSTRACT

Described is an aggregation device comprising a plurality of virtual network interface cards (vNICs) and an input/output (I/O) processing complex. The vNICs are in communication with a plurality of processing devices. Each processing device has at least one virtual machine (VM). The I/O processing complex is between the vNICs and at least one physical NIC. The I/O processing complex includes at least one proxy NIC and a virtual switch. The virtual switch exchanges data with a processing device of the plurality of processing devices via a communication path established by a vNIC of the plurality of vNICs between the at least one VM and at least one proxy NIC.

38 Claims, 7 Drawing Sheets

SYSTEMS AND METHODS FOR INPUT/OUTPUT VIRTUALIZATION

FIELD OF THE INVENTION

The present invention relates generally to virtualized networks, and more specifically, to systems and methods for input/output (I/O) virtualization.

BACKGROUND

Data centers are generally centralized facilities that provide Internet and intranet services supporting businesses and organizations. A typical data center can house various types of electronic equipment, such as computers, domain name system (DNS) servers, network switches, routers, data storage devices, and so on. A given data center can have hundreds or thousands of interconnected server nodes communicating with each other and external devices via a switching architecture comprising switches, routers, etc. Data centers can be configured for virtualization, permitting the server nodes to share network interface cards (NICs), hard disk drives, or other hardware. Virtualized environments typically require less hardware, thereby reducing power, floor space, cabling, and costs associated of running a data center.

BRIEF SUMMARY OF EMBODIMENTS

In accordance with an aspect, provided is an aggregation device comprising a plurality of virtual network interface cards (vNICs) and an input/output (I/O) processing complex. The vNICs are in communication with a plurality of processing devices. Each processing device has at least one virtual machine (VM). The I/O processing complex is logically between the vNICs and at least one physical NIC. The I/O processing complex includes at least one proxy NIC and a virtual switch. The virtual switch exchanges data with a processing device of the plurality of processing devices via a communication path established by a vNIC of the plurality of vNICs between the at least one VM and at least one proxy NIC.

In accordance with another aspect, there is provided a server aggregation system comprising a plurality of server nodes and an aggregation device. Each server node has at least one virtual machine (VM). The aggregation device is coupled between the plurality of server nodes, and includes a plurality of virtual network interface cards (vNICs) in communication with the server nodes; and an input/output (I/O) processing complex. The I/O processing complex includes at least one proxy NIC and a virtual switch that exchanges data with a server node of the plurality of server nodes via a communication path established by a vNIC of the plurality of vNICs between the at least one VM and at least one proxy NIC.

In accordance with an aspect, there is provided a method of performing an I/O operation in a virtualized network. The method comprises creating a virtual switch at an aggregation device and forming a communication path between a virtual machine at a server node and the virtual switch at the aggregation device.

In accordance with an aspect, there is provided a computer program product comprising a computer readable storage medium having computer readable program code embodied therewith. The computer readable program code comprises computer readable program code configured to create a virtual switch at an aggregation device; and computer readable program code configured to form a communication path between a virtual machine at a server node and the virtual switch at the aggregation device.

In accordance with an aspect, there is provided a method for reducing overhead associated with an I/O virtualization operation, comprising: constructing and arranging a virtual switch at a server node aggregation device; and forming a data path over a communication channel between one or more server node virtual machines and a physical device in communication with the virtual switch.

In accordance with an aspect, there is provided an aggregation system, comprising: a plurality of virtual machines at one or more processing devices; and an input/output (I/O) processing complex in communication with the one or more processing devices. The I/O processing complex includes a virtual switch. The I/O processing complex establishes a data path over a communication channel between a virtual machine of the one or more virtual machines and the virtual switch.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Figure 1:
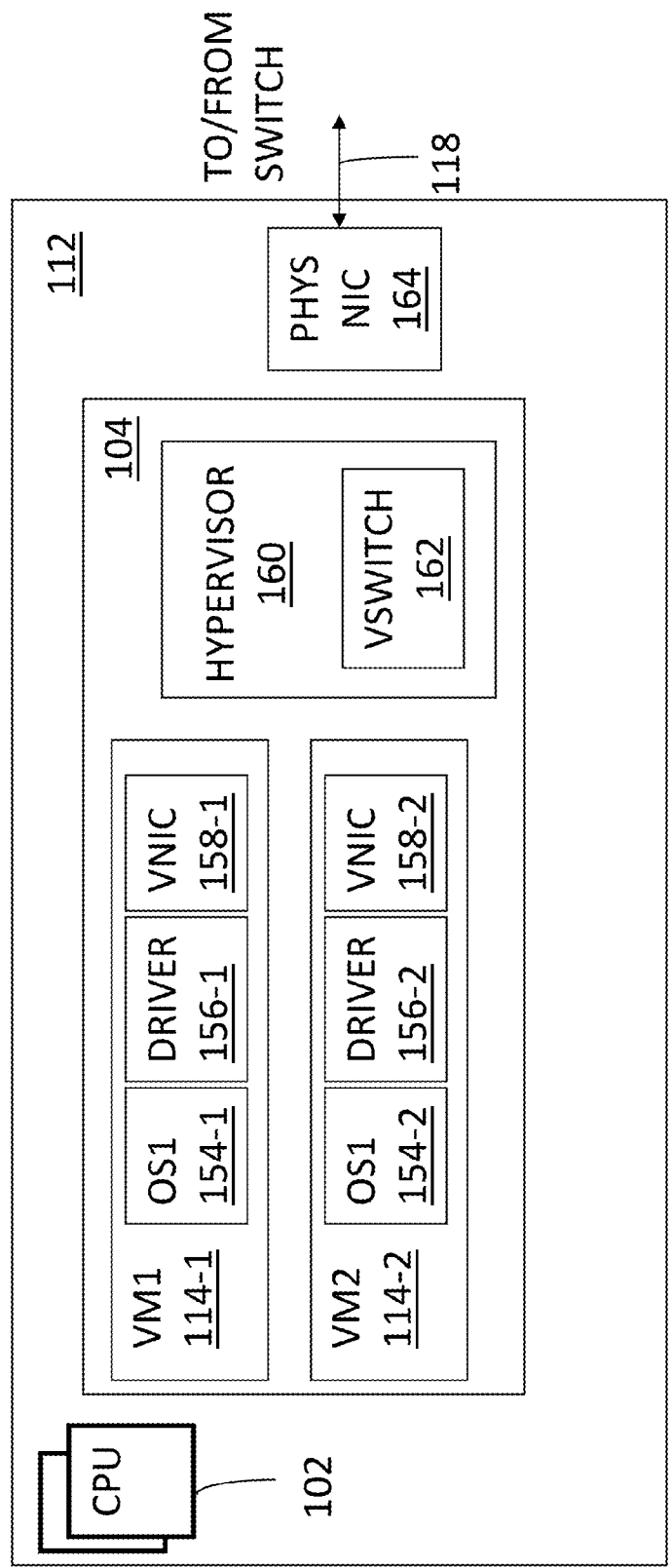
FIG. 1 is a block diagram of a conventional server node.

FIG. 1 is a block diagram of a conventional server node 112. The server node 112 include one or more processors 102, for example, microprocessors, central processing units (CPUs), graphics processing units (GPUs), digital signal processors (DSPs), application-specific integrated circuits (ASICs), memory controllers, multi-core processors, bus adapters, and other types of data processing devices, or combinations of these and other devices.

The server node 112 also includes a local memory 104 and a network interface card (NIC) 164. The local memory 104 can include non-volatile or volatile memory, for example, dynamic random access memory (DRAM) or static RAM (SRAM). The NIC 164 can include an Ethernet, peripheral component interconnect express (PCIe), or other network connector 118 for establishing an electronic communication with a switching device, for example, a network switch or router.

The server node 112 can be configured for virtualization. Accordingly, provided at the local memory 104 can include one or more virtual machines (VMs) 114-1, 114-2 (generally, 114), permitting different processing environments to occur at the server node 112. The VMs 114-1, 114-2 can include an operating system 154-1, 154-2 (generally, 154) corresponding to a virtual machine 152, a guest device driver 156-1, 156-2 (generally, 156), and a virtual network interface card (vNIC) 158-1, 158-2 (generally, 158), respectively. The server node 112 includes a hypervisor 160 that provides a virtualization abstraction of physical elements of the server node 112, thereby permitting the VMs 114 to share hardware resources, for example, the NIC 164. The VMs 114 can communicate with the hypervisor 160 using an I/O virtualization framework such as virtio.

Each guest operating system 154-1, 154-2 can execute program code corresponding to one or more applications. This feature is desirable in a data center environment, where one customer can run a set of applications at a first virtualization environment including the VM 114-1, while another customer can run a set of different applications at a second virtualization environment including the VM 114-2. The hypervisor 160 can include a virtual switch 162, or vswitch, that provides network connectivity within the virtualization environments so that the applications running at the VMs 114-1, 114-2 can communicate within the virtual network. In addition to routing, the virtual switch 162 at the server node 112 can provide other features such as packet inspection and security controls, for example, access control lists (ACL) for network firewalls.

The hypervisor 160 and the virtual switch 162 perform I/O virtualization operations at the server node 112, which can include the use of a slow and processor-intensive "world switch" between the VMs 114. Virtual switching at the hypervisor 160 in this manner adds overhead and degrades VM I/O performance, resulting in inefficient utilization of bandwidth, CPU resources, and also resulting in high latency. Inconsistent CPU utilization can occur, since the virtual switch 162 can assume CPU cycles intended for a client application under one VM, e.g., VM 114-1, which can affect applications running at another VM, e.g., VM 114-2.

In order to reduce CPU overhead and traffic latency associated with virtualized environments, there is a desire to provide a direct pass-though of NIC devices to guest virtual machines. However, doing so requires bypassing the hypervisor 160 and virtual switch 162, resulting in limitations with respect to functionality and security offered by the virtual switch 162.

The present inventive concepts provide an aggregation system and method for reducing overhead associated with I/O virtualization operations performed between server node VMs and physical devices such as NICs, basic input output system (BIOS), host bus adapter (HBA) hard drives, and the like, by constructing and arranging a virtual switch at a server node aggregation system and forming a data path over a communication channel (e.g., a PCIe connection or the like) from the server node VMs to the server node aggregation system. A virtual switch at a server node aggregation system offloads virtual switching functions from a hypervisor at a server node. In doing so, CPU-intensive processing related to I/O virtualization operations at a server node is reduced, since the hypervisor's role in such operations is reduced or eliminated. Virtual networks can therefore extend to an aggregation device, providing scalability at a data center or other environment requiring large-scale communications between electronic devices. The virtual switch is not limited with respect to processing ACLs, monitoring security between virtual machines, or related to routing decisions, tunneling, for example, IP or generic routing encapsulation (GRE) tunneling, or related features at a virtualized host. Instead, such features are made available at the server node aggregation system.

As described above, VMs at the attached server nodes can communicate with a hypervisor using virtio (a virtualization framework for I/O known in the art). Embodiments of the present inventive concepts establish that when an I/O operation is performed, the hypervisor's role is reduced or eliminated with respect to I/O. Instead, hardware can be provided to perform the I/O operations of VMs, for example, establishing a direct communication between the VMs and the server node aggregation system, reducing I/O latency and CPU resources otherwise consumed by the VM. Instead, the server node aggregation system communicates with the local memories of the interconnected server nodes, for example, to read/write data in an I/O operation. The server node aggregation system can include an input/output memory management unit (IOMMU). The IOMMU can be controlled by the hypervisor, for example to provide memory protection, while facilitating a pass-through across the hypervisor, for example, when performing a direct memory access (DMA) operation. This feature can eliminate memory-to-memory data copies from occurring under the direction of the hypervisor. Another feature is that a vNIC can be made available to a guest at a virtualized server node, permitting a direct attachment to the aggregation system without intervention by a hypervisor.

Figure 2:
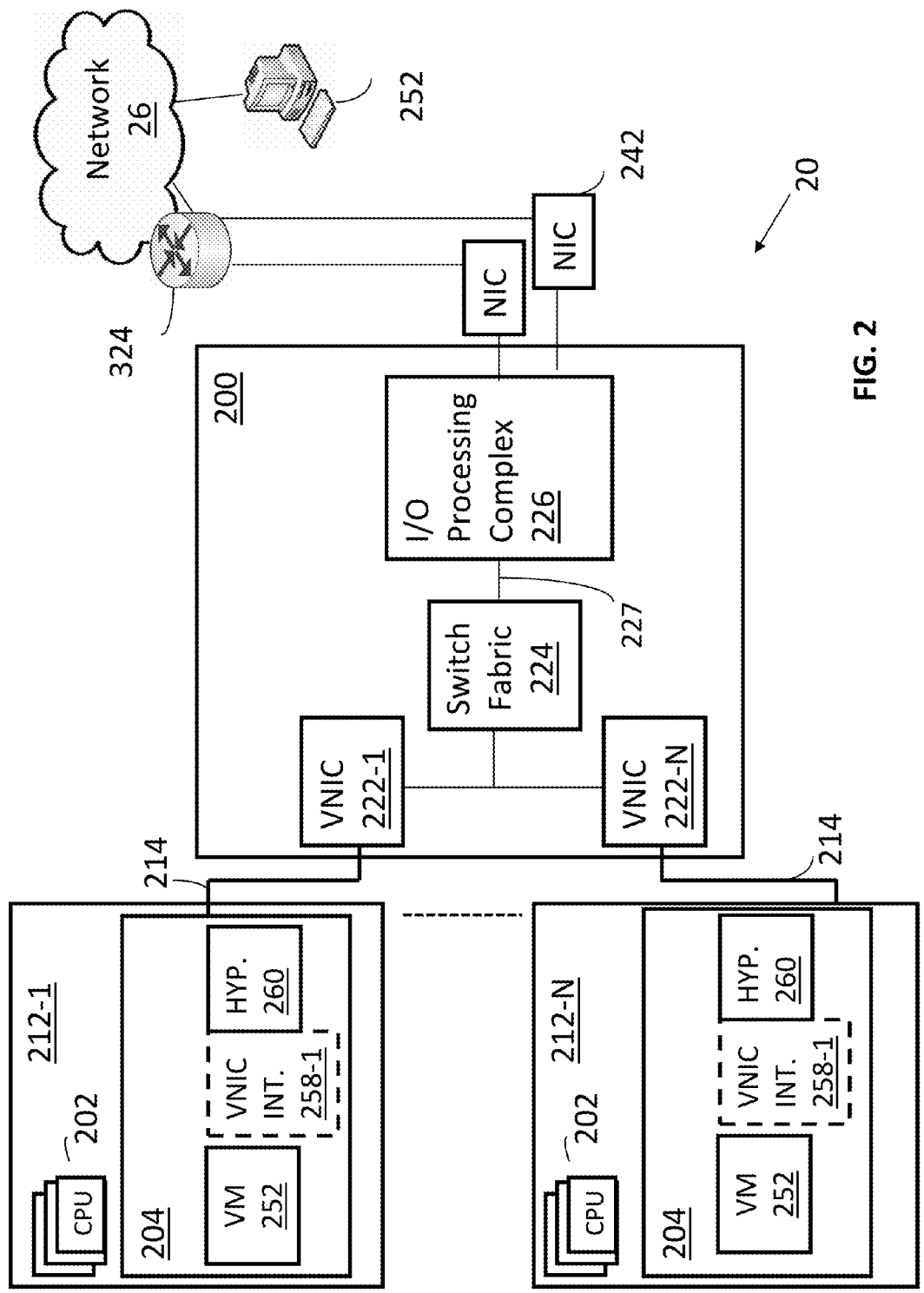
FIG. 2 is a block diagram of a computing infrastructure including a plurality of server nodes in communication with an aggregation system, in accordance with an embodiment.

FIG. 2 is a block diagram of a computing infrastructure including a plurality of server nodes 212-1 through 212-N (generally, 212) in communication with an aggregation system 200, in accordance with an embodiment.

The aggregation system 200 includes a plurality of vNICs 222-1 to 222-N (generally, 222), a switch fabric 224 and an I/O processing complex 226. The server nodes 212, or related processing devices, can rely on the aggregation system 200 to share physical devices such as a NIC 242, or share memory, BIOS, or other computer hardware components in communication with the aggregation system 300.

The switch fabric 224 includes a plurality of I/O ports (not shown) that exchange data or other electronic information between the server nodes 212-212-N and/or one or more electronic devices 252 in communication with the aggregation system via a network router 324 and the like. The switch fabric 224 can include a switching configuration, for example, a crossbar, for moving data between the I/O ports, as is well-known to those of ordinary skill in the art. The switch fabric 224 and the I/O processing complex 226 can be interconnected via an I/O communication channel 227, which provides bandwidth for exchanging data between output ports at the switch fabric 224 and the I/O processing complex 226.

The I/O processing complex 226 processes data exchanged between the server nodes 212 and one or more external electronic devices, for example, a remote electronic device 252. In an embodiment, the I/O processing complex 226 includes a network processor for exchanging data between server nodes 212 and/or the remote electronic device 252. In another embodiment, the I/O processing complex 226 includes a multiplexer and other logic for performing data transfers to and from the switch fabric 224 in accordance with a control plane processor (not shown) at which the plurality of vNICs 222-1 to 222-N (generally, 222) can be provided. Here, the I/O processing complex 226 can serve as a staging area for transmitting data into and out of the aggregation system 200, for example, between two or more server nodes 312, or between a server node 212 and the remote computing device 252.

Each vNIC 222 can be connected to a virtual switch at the I/O processing complex 226 described in detail below. Each vNIC 222 can logically connect a VM 252 at a server node 212 to a port at a virtual switch at the I/O processing complex 226. This can be achieved by establishing a communication path via a PCIe connection 214 or related network connection between the vNIC 222 and a vNIC interface 258-1 to 258-N (generally, 258) at the server node 222 and exchanging data through the vNIC interface 258. Each vNIC 222 can be assigned an address, for example, a MAC address and/or an IP address.

The server nodes 212-1 through 212-N (generally, 212) can be single socket servers or other low-power processor-based servers. The server nodes 212 can be configured as a processor cluster or other well-known arrangement. The server nodes 212 can be configured to include one or more virtualization environments, for example, described herein. The server nodes 212 can maintain ring buffers and the like defined in the memory 204 for processing the data for performing a data transmit and/or receive operations.

The server nodes 212 can each include at least one processor 202, which can include one or more microprocessors, CPUs, GPUs, DSPs, ASICs, memory controllers, multi-core processors, or other data processing devices, or combinations of elements thereof.

The server nodes 212 each includes a local memory 204. The local memory 204 can be non-volatile or volatile memory, for example, one or more channels of DRAM or static RAM (SRAM). The server nodes 112 can each include an I/O logic (not shown) including a southbridge or related I/O controller for managing data transfers between the server node 212 and the aggregation system 200, and for performing other I/O functions known to those of ordinary skill in the art. The I/O logic can include an Ethernet interface, a PCIe interface, and/or other network connectors, interfaces, and the like for communicating via a unidirectional or bi-directional communication path 214 with the aggregation system 200.

Stored at the local memory 204 can include program code, such as program code related to one or more VMs 252, operating systems (not shown), and software applications (not shown), for example, customer applications in a data center environment.

The local memory 204 of a server node 212 can include at least one vNIC interface 258-1, 258-N (generally, 258). Each vNIC interface 258 is constructed and arranged to establish communications between one or more VMs 252 at a server node 112 and a vNIC 222 generated at the aggregation system 200. In an embodiment, a 1:1 relationship is established between a vNIC interface 258 and a corresponding vNIC 222. In another embodiment, an N:1 relationship, where N is an integer greater than 1, is established between vNIC interfaces 258 and a vNIC 222.

A vNIC interface 258 can include a set of registers including data for controlling a corresponding vNIC 222. A vNIC interface 258 can include a virtual DMA engine for transferring data between the server node memory 204 and the aggregation system 200. The vNIC interface 258 can include a mailbox to communicating with the corresponding vNIC 222, for example, informing the vNIC 222 that data sent to the vNIC 222 is to be processed. The vNIC interface 258 can include an interrupt generator that provides an interrupt to the CPU 202. For example, the CPU 202 may be interrupted indicating the arrival of data.

A vNIC interface 258 can provide a notification to a corresponding vNIC 222 over a PCIe bus or other communication path 214, indicating that data is moved to a local memory 204 at a server node 212 for transmission. VM I/O is sent directly to the I/O processing complex 226, more specifically, a virtual switch at the I/O processing complex 226, via the vNIC interface 258 and its corresponding vNIC 222.

In an embodiment, the VMs 252 communicate with the hypervisor 260 according to a consortium-provided standard such as virtio. In another embodiment, the VMs 252 communicate with the hypervisor 260 according to a proprietary communication. Regardless of the manner of communication between VMs 252 and the hypervisor 260, I/O operations can be performed via communications between the VMs 252 and a virtual switch (not shown) at the I/O processing complex 226 with little or no intervening I/O-related communication performed by the hypervisor 260. Accordingly, this feature can improve I/O performance and reduce latency related to data transfers between the VMs 252 and the I/O processing complex 226.

Figure 3:
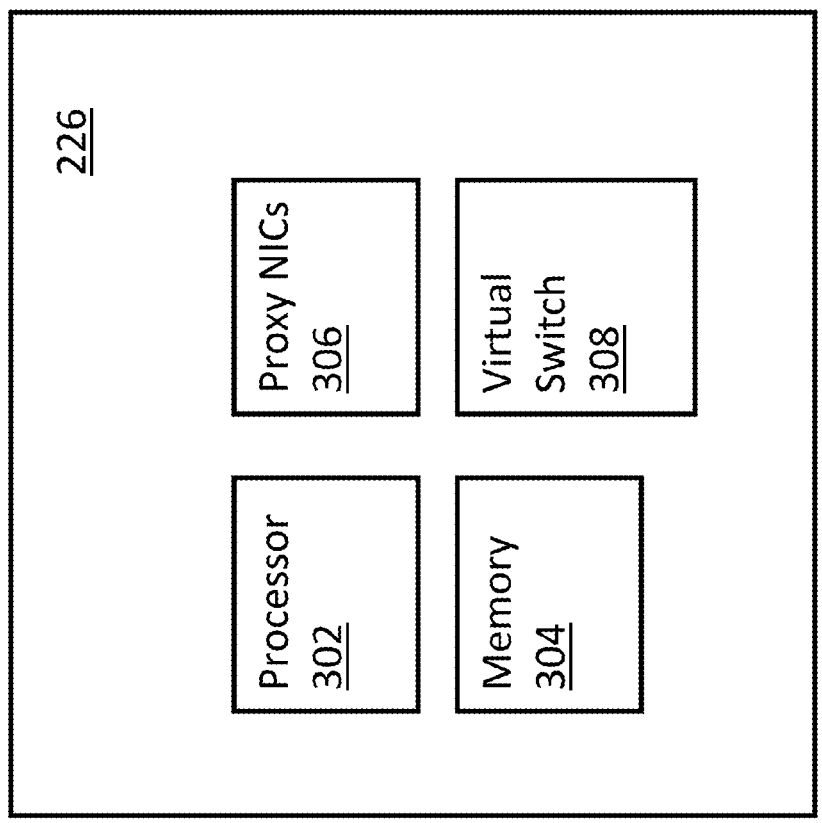
FIG. 3 is a block diagram of an I/O processing complex, in accordance with an embodiment.

FIG. 3 is a block diagram of an I/O processing complex 226, in accordance with an embodiment, for example, shown in FIG. 2. The I/O processing complex 226 can include a processor 302, a memory device 304, at least one proxy NIC 306, and at least one virtual switch 308.

The processor 302 executes program code for performing the functions of the I/O processing complex 226, for example, functions related to the virtual switch 308 such as directing data to a proxy NIC 306 based on a destination address associated with a data packet, and coordinating data transfers with the memory device 304 and between the server nodes 212 and/or external devices via NICs 242. The processor 302 can include one or more CPUs, GPUs, DSPs, ASICs, memory controllers, multi-core processors, or other types of data processing devices, or combinations of elements thereof. The processor 302 can be used by the virtual switch 308 and/or one or more proxy NICs 306 in communication with the virtual switch 308.

The memory device 304 can store a set of descriptors and/or data for processing by the virtual switch 308. The memory device 304 can maintain buffers, for example, receive buffers, for the NICs 242. The processor 302 can stream data to the virtual switch 308. This feature can eliminate the need to copy buffers, which can be used in place by creating new descriptors pointing to an original buffer in the memory device 304. In an embodiment, the memory device 304 is part of the I/O processing complex 226. In another embodiment, the memory device 304 is separate from the I/O processing complex 226 and positioned elsewhere, for example, another location at the aggregation system 200. The memory 304 can include rules, ACLs, or related criteria comprising executable CPU code and data that can be used by the virtual switch 308 for processing the data, for example. The rules, ACLs, and the like can be processed to determine conditions under which data can be forwarded to a destination, for example, whether to deny or forward data, where to forward the data, or other information on how to process a packet containing the data.

Each proxy NIC 306 is constructed and arranged to communicate directly with a vNIC 222, for example, in a 1:1 relationship. A vNIC 222-1 can establish a communication with a proxy NIC 306 under the control of the processor 302 according to destination information for the data received from a corresponding source server node 212-1. The vNIC 222-1 can send a request to the proxy NIC 306 for availability to receive data. The proxy NIC 306 can send a response indicating that it can receive the data. Otherwise, the vNIC 222-1 can wait until the proxy NIC 306 is available to process data received from the vNIC 222-1. The vNIC 222-1 and the proxy NIC 306 can enter a poll mode, whereby the proxy NIC 306 can receive periodic polls regarding memory location status, and a request for availability to receive and process data from the vNIC 222-1.

The proxy NIC 306 can place data in the memory 304 and/or retrieve data from the memory 304 during a data transfer operation. The proxy NIC 306 can generate a notification to the virtual switch 308 indicating that data is available at the memory device 304 for processing. The proxy NIC 306 can also retrieve data from the memory device 304 for processing by the virtual switch 308 and for outputting to a destination. The proxy NIC 306 can allocate data to the memory 304 after determining that sufficient memory locations are available. The processor 302 can manage the allocation of the data to the memory 304 by the proxy NIC 306.

The virtual switch 308 processes data packets, frames, cells, or other units of data, from the memory 304 or the proxy NIC 306. The virtual switch 308 can route the data to its destination according to header information of a packet, frame, and the like. The virtual switch 308 can provide logical connections among the VMs 252 at the server nodes 212 and/or between VMs 252 and physical devices, for example, physical NIC 242 or related output device. The aggregation system 200 can include multiple virtual switches 308, each associated with different proxy NICs 306. A data path to a virtual switch 308 from a proxy NIC 306 can provide destination information used by the virtual switch 308 to route received data. The virtual switch 308 can perform other functions known to those of ordinary skill in the art for example, packet classification, packet inspection and security controls, for example, ACLs, for network firewalls, and so on. The virtual switch 308 can process data according to a rules engine (not shown), for example, firewall rules establishing when to drop or forward data packets.

Figure 4:
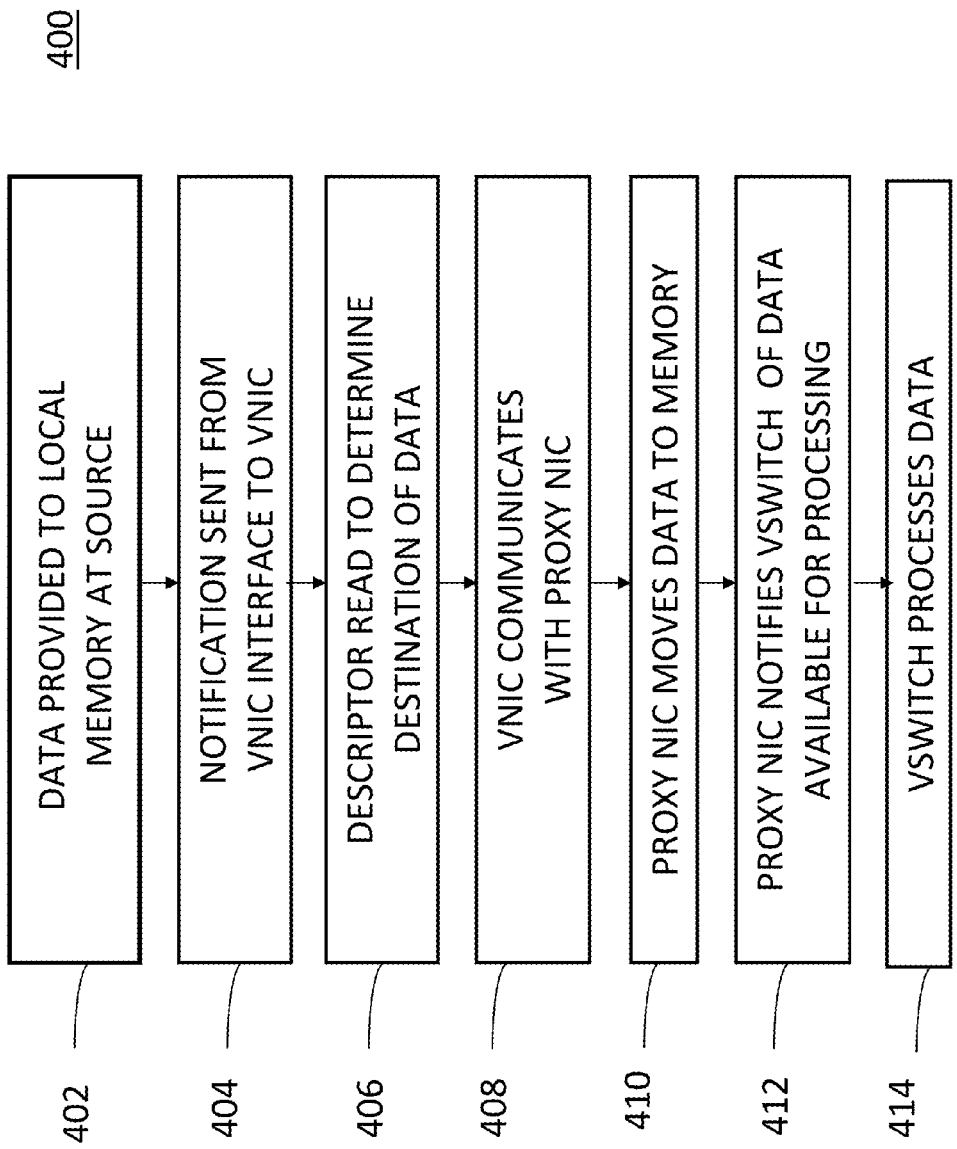
FIG. 4 is a flowchart illustrating a method for electronic communication between a server node and an aggregation system, in accordance with an embodiment.

FIG. 4 is a flowchart illustrating a method 400 for electronic communication between a server node and an aggregation system, in accordance with an embodiment. In describing the method 400, reference is made to a server node 212 and the aggregation system 200 described with reference to FIGS. 2 and 3. The method 400 can be governed by instructions that are stored in a local memory 204 of one or more server nodes 212 and/or the aggregation system 200 of FIGS. 2 and 3. Some or all of the method 400 can be performed on-die, at an ASIC, a system-on-a-chip (SOC), or related device.

At block 402, a cell, packet, frame or other fixed length or variable length unit of data can be provided to the local memory of a server node, for example, source server node 212-1, for output to a destination, for example, server node 212-N or an external electronic device 252. The CPU 202 of the source server node 212-1 can generate a descriptor or related information regarding the data in the local memory to be output from the server node 212. The descriptor can include a command, a scatter-gather list, and the like related to the data to be transferred to the aggregation system 200. The descriptor information can identify a location in the server node local memory 204 where the data contents reside, a destination address where the data is to be transmitted, the number of bytes of data to move, and/or other relevant information for transmitting the data to a destination electronic device.

At block 404, a notification can be generated by the vNIC interface 258-1 of the source server node 212-1 that data is in the local memory 204 and is available for transmission. The vNIC interface 258-1 can notify a corresponding vNIC 222-1 of the availability of data for transmission. The CPU 202 can generate a mailbox write or related event notification that is sent to the vNIC 222-1 via the vNIC interface 252-1 over a communication path 214, e.g., a PCIE bus.

At block 406, the vNIC 222-1 reads and processes the descriptor to determine a destination address or related information. Alternatively, meta information can be provided with a transmit descriptor or packet that identifies a destination port. Accordingly, the vNIC 222-1 determines that data is available for transfer.

At block 408, the vNIC 222-1 can use the destination information to identify a proxy NIC 306 that communicates with an interface at a particular virtual switch 308 for processing data from the source server node 212-1. The vNIC 222-1 can communicate with the proxy NIC 306 according to a mode of communication. In accordance with one mode, the vNIC 222-1 can establish a direct communication with the proxy NIC 306, regardless of the state of the proxy NIC 306, for example, regardless of whether there is an available buffer location for the data. In accordance with another mode, a determination can be made whether a buffer location is available for the data. If so, a communication path is established between the vNIC 222-1 and the proxy NIC 306. The I/O processing complex 226 can be manually or automatically configured for at least one mode of communication. Accordingly, a data path can be formed from the data origin, for example, a VM 252 at the source server node 212-1, to the proxy NIC 306, which in turn communicates with the virtual switch 308. See, for example, data path 602 shown in FIG. 6. The vNICs 222 are constructed and arranged to output data from an associated VM 252 to the virtual switch 308 along the data path.

At block 410, the proxy NIC 306 can transfer the data to a buffer at the memory device 304 for subsequent processing by the virtual switch 308. The vNIC 222-1 can fetch descriptors from the server node local memory 204, and, accordingly, move the data over the established data path to the memory device 304 under the direction and control of the proxy NIC 306.

At block 412, the proxy NIC 306 generates a notification informing the virtual switch 308 of data at the memory device 304 that can be processed by the virtual switch 308.

At block 414, the virtual switch 308 can process the data, for example, inspecting data packets and the like. The virtual switch 308 can examine the data to determine whether it should be filtered or forwarded according to the descriptor and/or header information. The virtual switch 308 can coordinate the transfer of data between one or more proxy NICs 306 and one or more destination server nodes 212 memory and/or remote computing devices 252, for example, according to a predetermined policy. The virtual switch 308 can identify the source of the data from the proxy NIC 306, permitting the virtual switch 308 to perform functions such as maintaining ACLs, packet inspection, and the like. The virtual switch 308 can apply predetermined rules, process destination MAC addresses, and perform other virtual switch functions known to those of ordinary skill in the art. In this manner, processor-intensive operations related to a server node hypervisor can be reduced or eliminated. Also, issues related to variable loads, for example, CPU resources allocated to a virtual machine being consumed by other processes, can be avoided.

Figure 5:
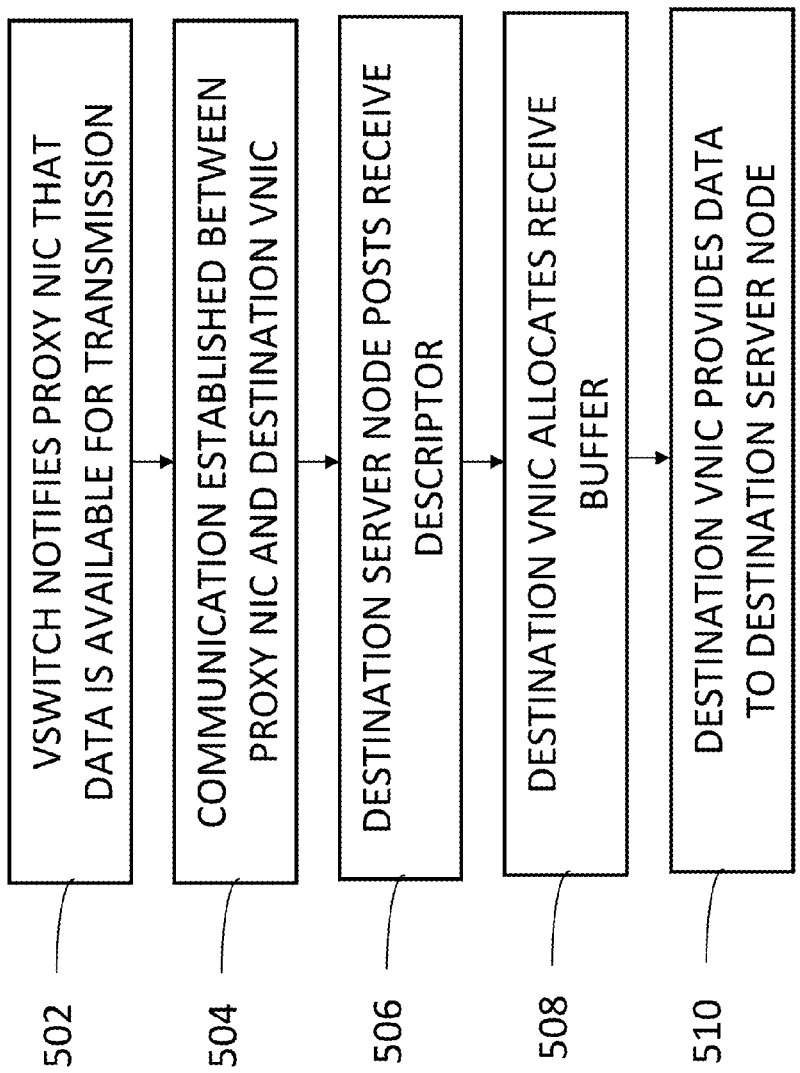
FIG. 5 is a flowchart illustrating a method for electronic communication between a virtual switch and a destination server node, in accordance with an embodiment.

FIG. 5 is a flowchart illustrating a method 500 for electronic communication between a virtual switch and a destination server node, in accordance with an embodiment. In describing the method 500, reference is made to FIGS. 2-4. The method 500 can be governed by instructions that are stored in a local memory 204 of one or more server nodes 212 and/or the aggregation system 200 of FIGS. 2 and 3. Some or all of the method 500 can be performed on-die, at an ASIC, a system-on-a-chip (SOC), or a related device.

The virtual switch 308 receives data from the proxy NIC 306, which in turn can retrieve the data from the memory 304. The virtual switch 308 can classify, route, or otherwise process the data, for example, for forwarding the data to a destination server node 212-N or remote computing device 252. The virtual switch 308 can perform other well-known virtual switch functions such as packet encapsulation/decapsulation, layer 2 security, and other well-known virtual switch features.

At block 502, the virtual switch 308 notifies a proxy NIC 306 that data is available for transmission. The proxy NIC 306 can be determined from destination information, such as an address.

At block 504, the proxy NIC 306 establishes a communication with a destination vNIC 222-N. The communication can be established at a bidirectional path between the proxy NIC 306 and the vNIC 222-N. The proxy NIC 306 can process the destination information in a packet header or other field corresponding to the data payload forwarded by the virtual switch 308 to identify a vNIC 222 to receive the data. The proxy NIC 306 can notify the vNIC 222-N that the data is available for routing by the virtual switch 308. The processor 302 can create a transmit descriptor containing command/scatter data. The processor 302 can inform the proxy NIC 306 that transmit data is available for output from the virtual switch 308.

At block 506, a CPU 202 at the destination server node 212-N can post a receive descriptor that points to an available data buffer in the local memory 204 of the destination server node 212-N. The receive descriptor can include a buffer address, length, or related information. Descriptors can be posted by ringing a doorbell occurring in hardware.

At block 508, the destination vNIC 222-N can allocate a receive buffer from the destination node memory 204 for receiving the data from the virtual switch 308. If no receive buffers are currently available, the I/O processing complex 226 can wait for a receive buffer to become available at the destination server node memory 204.

At block 510, the destination vNIC 222-N fetches and processes a descriptor for a receive buffer and moves the data to the local memory 204 at the destination server node 212-N.

Figure 6:
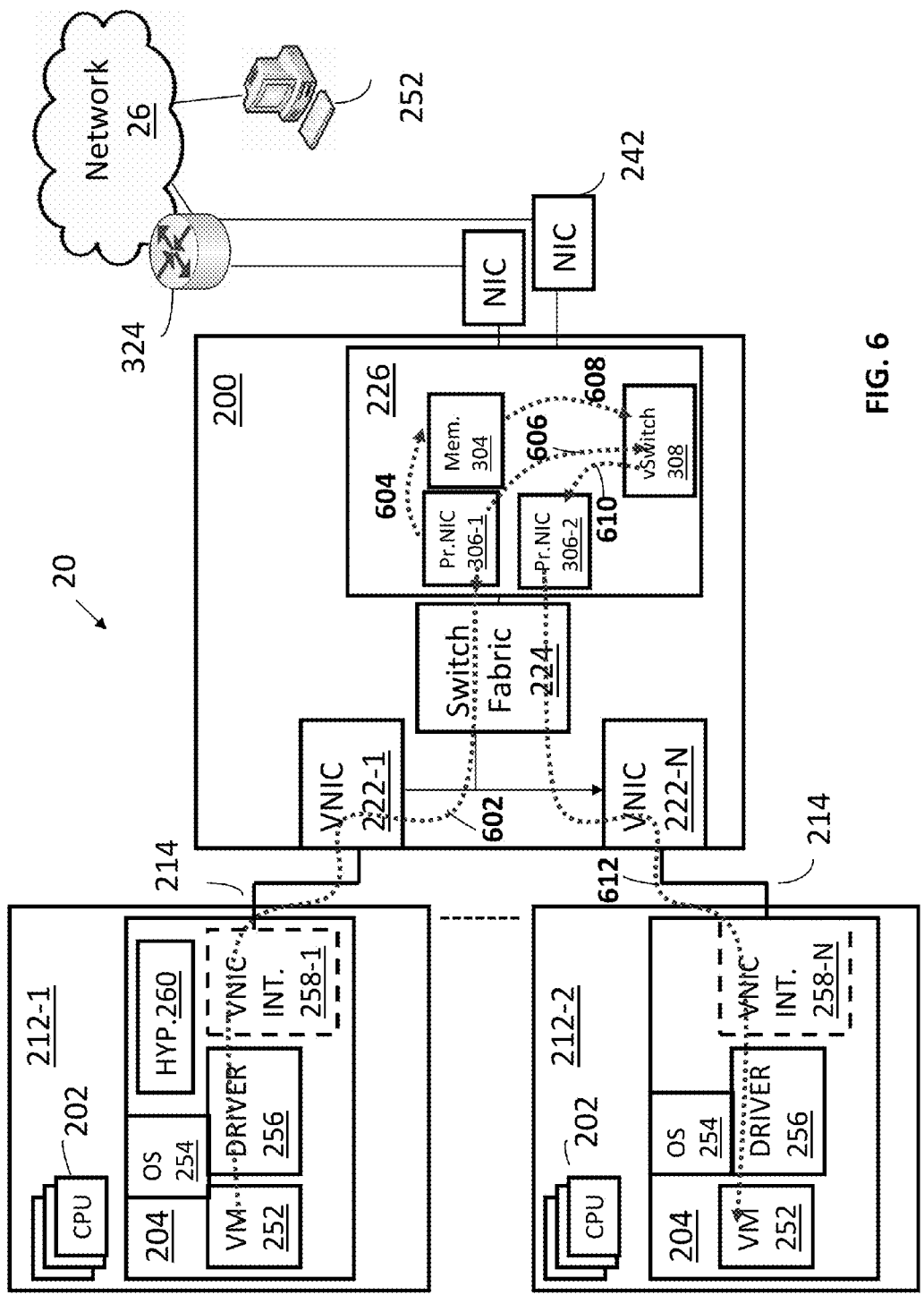
FIG. 6 is an illustration of data flow paths in a computing infrastructure, in accordance with another embodiment.

FIG. 6 is an illustration of data flow paths in a computing infrastructure 20, in accordance with another embodiment. In describing FIG. 6, reference is made to FIGS. 2-5.

A data path 602 is formed from a VM 252 at the source server node 212-1 to a proxy NIC 306-1 at the aggregation system 200. The data path 602 can be formed according to the method 400 described herein. The proxy NIC 306-1 is determined according to destination information provided to the vNIC 222-1 along the data path 602. The proxy NIC 306-1 outputs data 604 received via the data path 602 into an available location at the memory 304.

The proxy NIC 306-1 sends a notification 606 to the virtual switch 308, informing the virtual switch 308 that data is available for processing. The virtual switch 306 can process 608 the data, for example, forwarding the data to a destination, applying rules, ACLs, or other security features. The virtual switch 308 can output 610 the data to a selected proxy NIC 306-2, for example, according to block 502 described with reference to FIG. 5.

A data path 612 is formed from the virtual switch 308 to a target VM 252 at the destination server node 212-2. The data path 612 can be formed according to the method 400 and/or method 500 described herein.

Figure 7:
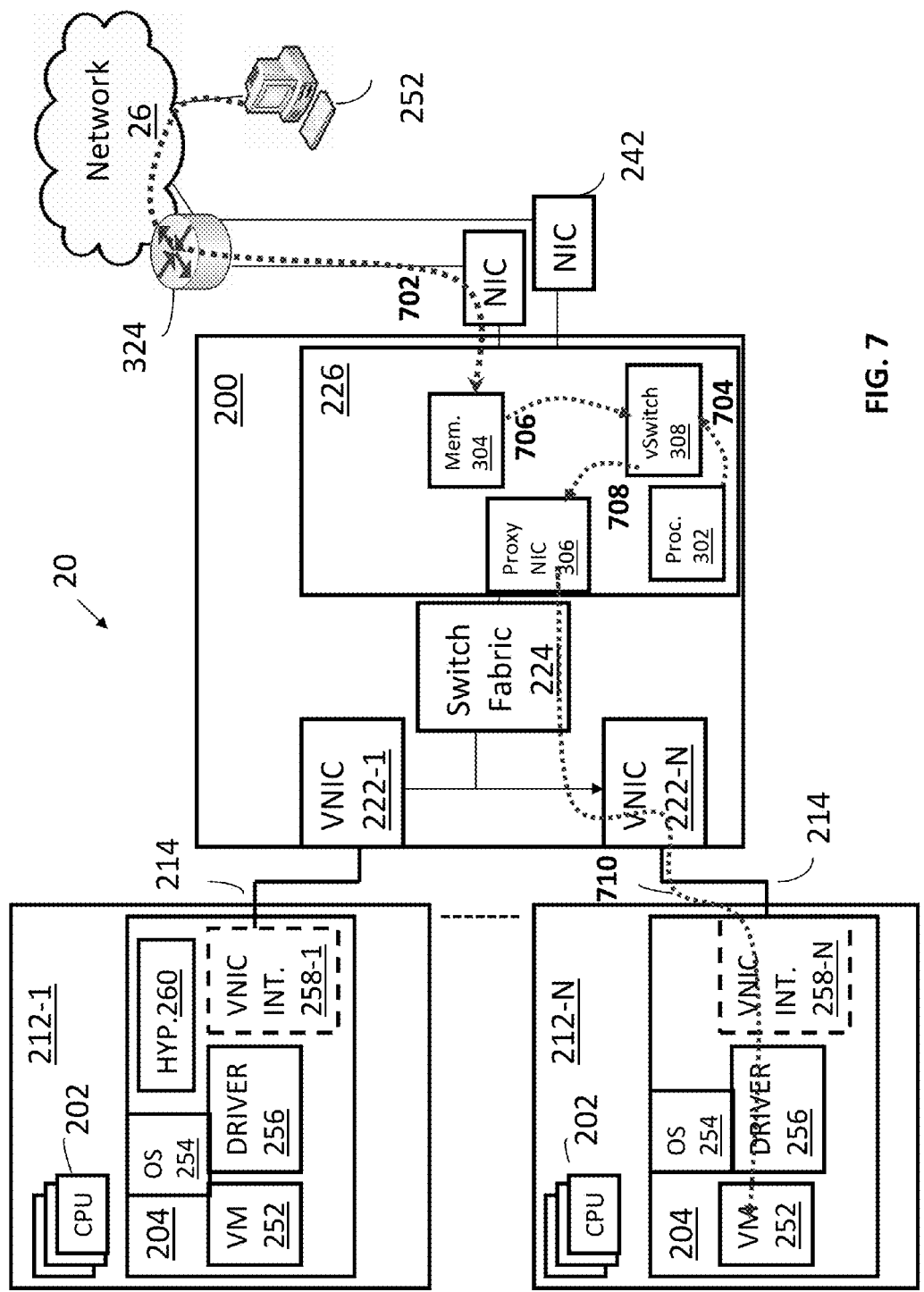
FIG. 7 is an illustration of data flow paths in a computing infrastructure, in accordance with another embodiment.

FIG. 7 is another illustration of data flow paths in a computing infrastructure 20, in accordance with another embodiment.

A data packet is output 702 from a remote computer 252 to a receive buffer at the memory 304 in communication with a NIC 242.

The processor 302 can notify 704 the virtual switch 308 that there is data in the memory 304 for processing.

The virtual switch 308 can retrieve 706 the data from the memory 304 and process the data, for example, route, inspect, and so on.

A data path 708 is formed from the proxy NIC 306 and a target VM 252 at the destination server node 212-2. The data path 708 can be formed according to the method 400 and/or method 500 described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. An aggregation device, comprising:
   a plurality of virtual network interface cards (vNICs) in communication with a plurality of processing devices, each processing device having at least one virtual machine (VM); and
   an input/output (I/O) processing complex logically between the vNICs and at least one physical NIC, the I/O processing complex including at least one proxy NIC and a virtual switch, the virtual switch exchanging data with a processing device of the plurality of processing devices via a communication path established by a vNIC of the plurality of vNICs between the at least one VM and at least one proxy NIC, wherein the I/O processing complex further includes a memory that temporarily stores the data exchanged between the processing device and the virtual switch.

2. The aggregation device of claim 1, wherein a proxy NIC of the at least one proxy NIC outputs the data from the communication path to the memory.

3. The aggregation device of claim 1, wherein a proxy NIC of the at least one proxy NIC retrieves the data from the memory for output to a destination processing device.

4. The aggregation device of claim 1, wherein the communication path extends between a vNIC interface at the processing device that corresponds to the vNIC and the at least one proxy NIC.

5. The aggregation device of claim 1, further comprising a switch fabric coupled to the I/O processing complex, the switch fabric including a plurality of ports, wherein the data is received from an input port of the plurality of ports and output to the I/O processing complex via an output port of the plurality of ports.

6. The aggregation device of claim 1, wherein the processing device includes a virtualized server node.

7. The aggregation device of claim 1, wherein the virtual switch is connected to the at least one physical NIC for exchanging the data between the processing device and a remote electronic device via the at least one physical NIC.

8. The aggregation device of claim 1, further comprising peripheral component interconnect express (PCIe) connectors for connecting the aggregation device and the plurality of processing devices.

9. The aggregation device of claim 1, wherein the virtual switch at the aggregation device provides security features related to the exchanged data.

10. A server aggregation system, comprising:
    a plurality of server nodes, each server node having at least one virtual machine (VM); and
    an aggregation device coupled between the plurality of server nodes, the aggregation device including:
       a plurality of virtual network interface cards (vNICs) in communication with the server nodes; and
       an input/output (I/O) processing complex, the I/O processing complex including at least one proxy NIC and a virtual switch that exchanges data with a server node of the plurality of server nodes via a communication path established by a vNIC of the plurality of vNICs between the at least one VM and at least one proxy NIC, wherein the I/O processing complex further includes a memory that temporarily stores the data exchanged between the server node and the virtual switch.

11. The server aggregation system of claim 10, wherein at least one server node of the plurality of server nodes includes a virtual interface in communication with the vNIC of the plurality of vNICs, and wherein the communication path extends between the virtual interface and the at least one proxy NIC.

12. The server aggregation system of claim 11, wherein the virtual interface comprises:
a virtual DMA engine that establishes a communication between a memory at the server node and the aggregation device;
a mailbox that informs the vNIC that data sent to the vNIC is to be processed
an interrupt generator that provides an interrupt to a processor at the server node, indicating the arrival of data at the server node; and
a set of registers including data for controlling at least one vNIC corresponding to the server node.

13. The server aggregation system of claim 10, wherein a proxy NIC of the at least one proxy NIC outputs the data from the communication path to the memory.

14. The server aggregation system of claim 10, wherein a proxy NIC of the at least one proxy NIC retrieves the data from the memory for output to a destination server node of the plurality of server nodes.

15. The server aggregation system of claim 14, wherein a second communication path extends between a virtual interface at the destination server node that corresponds to a destination vNIC and the proxy NIC.

16. The server aggregation system of claim 10, further comprising a switch fabric coupled to the I/O processing complex, the switch fabric including a plurality of ports, wherein the data is received from an input port of the plurality of ports and output to the I/O processing complex via an output port of the plurality of ports.

17. The server aggregation system of claim 10, wherein the virtual switch provides security features related to the exchanged data.

18. A method of performing an I/O operation in a virtualized network, comprising:
creating a virtual switch at an aggregation device; and
forming a communication path between a virtual machine at a server node and the virtual switch at the aggregation device, wherein forming the communication path between the virtual machine at the server node and the virtual switch at the aggregation device comprises:
providing data to a local memory at the server node;
sending a notification from a virtual interface at the server node to a virtual network interface card (vNIC) at the aggregation device;
generating a descriptor at the server node;
reading the descriptor to determine a destination of the data; and
establishing a communication between the vNIC and a proxy NIC at the aggregation device.

19. The method of claim 18, further comprising: notifying, by the proxy NIC, the virtual switch that the data is available for processing.

20. The method of claim 18, wherein forming the communication path between the virtual machine at a server node and the virtual switch at the aggregation device comprises:
notifying, by the virtual switch, a proxy NIC at the aggregation device that data is available for transmission from the aggregation device to the server node;
establishing a communication between the proxy NIC and a destination vNIC at the aggregation device; and
establishing a communication between the destination vNIC and a virtual interface at the server node.

21. The method of claim 18, further comprising:
posting at the server node a receive descriptor; and
allocating, by the destination vNIC, a receive buffer at a memory at the server node.

22. The method of claim 18, further comprising:
processing data at the virtual switch according to source server node information.

23. The method of claim 18, wherein the virtual switch at the aggregation device provides security features related to the exchanged data.

24. The method of claim 18, where forming the communication path includes forming a
data path over a communication channel between the virtual machine and a physical device in communication with the virtual switch.

25. The method of claim 24, wherein the physical device includes a network interface card, a basic input output system (BIOS), a host bus adapter (HBA), or a storage device.

26. A computer program product, comprising: a non-transitory computer readable storage medium having computer readable program code embodied therewith, the computer readable program code comprising:
computer readable program code configured to create a virtual switch at an aggregation device; and
computer readable program code configured to form a communication path between a virtual machine at a server node and the virtual switch at the aggregation device, wherein forming the communication path between the virtual machine at the server node and the virtual switch at the aggregation device comprises:
providing data to a local memory at the server node;
sending a notification from a virtual interface at the server node to a virtual network interface card (vNIC) at the aggregation device;
generating a descriptor at the server node;
reading the descriptor to determine a destination of the data; and
establishing a communication between the vNIC and a proxy NIC at the aggregation device.

27. A method for reducing overhead associated with an I/O virtualization operation, comprising:
constructing and arranging a virtual switch at a server node aggregation device; and
forming a data path over a communication channel between one or more server node virtual machines and a physical device in communication with the virtual switch, wherein forming the data path between the one or more server node virtual machines and the virtual switch comprises:
sending a notification from a virtual machine of a server node to a virtual network interface card (vNIC) at the aggregation device; and
establishing a communication path between the vNIC and a proxy NIC at the aggregation device.

28. The method of claim 27, wherein the communication channel includes a PCIe connection.

29. The method of claim 27, further comprising: notifying, by the proxy NIC, the virtual switch that the data is available for processing.

30. The method of claim 27, wherein forming the communication path between the one or more server node virtual machines and the virtual switch at the aggregation device comprises:

notifying, by the virtual switch, a proxy device at the aggregation device that data is available for transmission from the aggregation device to a virtual machine at the one or more virtual machines;
establishing a communication between the proxy device and a destination virtual device at the aggregation device; and
establishing a communication between the destination virtual device and a virtual interface at the server node.

31. The method of claim 27, further comprising:
processing data at the virtual switch according to source server node information.

32. The method of claim 27, wherein the virtual switch at the aggregation device provides security features related to the exchanged data.

33. The method of claim 27, wherein the physical device includes a network interface card (NIC), a basic input output system (BIOS), a host bus adapter (HBA), or a storage device.

34. An aggregation system, comprising:
a plurality of virtual machines at one or more processing devices;
an input/output (I/O) processing complex in communication with the one or more processing devices, the I/O processing complex including a virtual switch and a proxy NIC, wherein the I/O processing complex establishes a data path over a communication channel between a virtual machine of the one or more virtual machines and the virtual switch, via a communication path established by a vNIC and the proxy NIC, and wherein the I/O processing complex further includes a memory that temporarily stores the data exchanged between the virtual machines, the virtual switch, and the physical device.

35. The aggregation system of claim 34, further comprising:
a physical device in communication with the I/O processing complex, wherein the communication channel is between the one or more virtual machines and the physical device.

36. The aggregation system of claim 35, wherein the physical device includes a network interface card (NIC), a basic input output system (BIOS), a host bus adapter (HBA), or a storage device.

37. The aggregation system of claim 34, wherein the communication channel includes a PCIe connection.

38. The aggregation system of claim 34, wherein the virtual switch at the input/output (I/O) processing complex provides security features related to the exchanged data.

* * * * *